Figure 1:
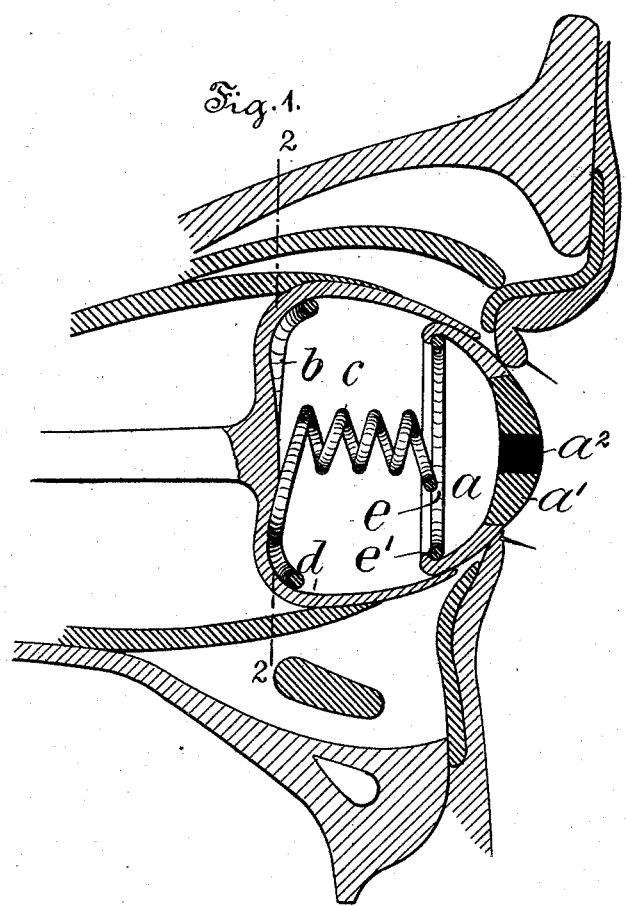

(No Model.)

J. L. BORSCH.
ARTIFICIAL EYE.

No. 474,808. Patented May 17, 1892.

Witnesses:
Hermann Bormann
Thomas M. Smith

Inventor:
John L. Borsch.
by Augustus B. Stoughton
Att'y.

UNITED STATES PATENT OFFICE.

JOHN L. BORSCH, OF PHILADELPHIA, PENNSYLVANIA.

ARTIFICIAL EYE.

SPECIFICATION forming part of Letters Patent No. 474,808, dated May 17, 1892.

Application filed March 4, 1892. Serial No. 423,704. (No model.)

*To all whom it may concern:*

Be it known that I, JOHN L. BORSCH, a citizen of the United States, residing at the city of Philadelphia, in the county of Philadelphia and State of Pennsylvania, have invented certain new and useful Improvements in Artificial Eyes, of which the following is a specification.

It is well known that the human eye is contained in a socket adapted for its reception and is controlled by its complemental muscles in such manner that it is susceptible of a range of rotary movement and of a slight adjustment out of and into its socket.

Hitherto artificial eyes have been provided that rested upon the socket from which the natural eye had previously been removed and were retained to place by the eyelids. Such eyes were engaged by the muscles, but were afforded only a very slight range of movement because they rested firmly upon the socket. These eyes were usually made of glass and had the pupil and iris suitably indicated upon them. In practice it was exceedingly difficult to fit such eyes, because in order to attain the best results it was necessary that the rim of the eye should fit the socket and that the pupil and iris should correspond both in color and position with the corresponding parts of the natural eye, so that it frequently happened that an artificial eye might fulfill one of the requirements and be utterly useless because it did not meet the other requirements. For example, the artificial eye might correspond in color with the natural eye and yet be utterly useless because it failed to fit the socket and have the iris and pupil disposed properly in respect to the corresponding parts of the natural eye.

The principal objects of my present invention are, first, to obviate the above-mentioned defects and disadvantages and to provide an artificial eye that is susceptible of receiving all the movements that are imparted to a natural eye by its complemental muscles, and, second, to provide an artificial eye that may be readily adjusted to fit a socket of any size and shape and to correspond exactly in position with the natural eye which it is intended to match.

My invention consists of an artificial eye provided with a support adapted to rest upon the socket.

My invention further consists of an artificial eye provided with a support adapted to rest upon the socket and connected with the eye by a flexible connection.

My invention further consists of an artificial eye provided with an adjustable support adapted to rest upon the socket.

My invention further consists of an artificial eye provided with a detachable support adapted to rest upon the socket.

My invention further consists in the improvements hereinafter described and claimed.

The nature and objects of my present invention will be more fully understood from the following description, taken in connection with the accompanying drawings, forming part hereof, and in which—

Figure 2:
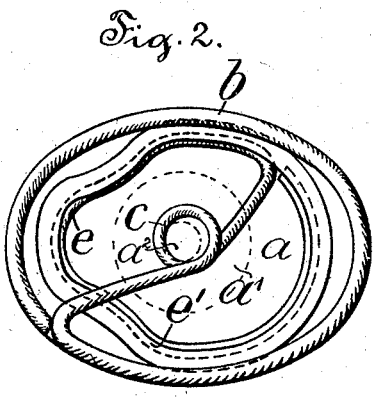

Figure 1 is a transverse sectional view of an artificial eye embodying features of my invention, showing the same in application to an eye-socket; and Fig. 2 is a plan view showing the same removed from the eye-socket.

In the drawings, $a$ is an artificial eye having an iris $a'$ and a pupil $a^2$ indicated thereon. The coloring of the eye $a$ must correspond with the coloring of the natural eye with which it is intended to be used. $b$ is a support adapted to rest upon the socket $d$. This support is composed of any material that will not corrode and is preferably made of wire, so that it may be readily adjusted by means of pliers or other tools to fit a socket of any size or shape. This support $b$ is preferably connected with the eye $a$ by means of a flexible connection, as the spring $c$, which by its resiliency affords the artificial eye $a$ perfect freedom of motion independent of its support $b$, so that it can be shifted by the muscles in precisely the same manner as a natural eye. When the flexible connection consists of a spring $c$, it may also be extended or compressed axially in order to effect the adjustment of the artificial eye with reference to the face of the user, whereby it is possible to avoid the sunken appearance that so often accompanies the use of ordinary glass eyes. The spring $c$ is preferably provided with a ring $e$, adapted to be engaged by a projection $e'$ upon the back of the artificial eye $a$, so that the support $b$ may be readily detached therefrom, then bent to fit the socket $e$, and finally returned to place in connection with the eye. However, the projection $e'$ may be dispensed with, and in such case the ring $e$ is cemented or otherwise rigidly attached to the back of the eye $a$.

It may be remarked that some of the hereinabove-described devices may be dispensed with, and hence I do not desire to limit my invention to the exact construction and arrangement of parts hereinabove described, and illustrated in the accompanying drawings; but,

Having thus described the nature and objects of my invention, what I claim as new, and desire to secure by Letters Patent, is—

1. An artificial eye provided with a support adapted to rest upon the socket of the natural eye, substantially as and for the purposes set forth.

2. An artificial eye provided with a support adapted to rest upon the socket and having a flexible connection interposed between the eye and socket, substantially as and for the purposes set forth.

3. An artificial eye provided with an adjustable support adapted to rest upon the socket, substantially as and for the purposes set forth.

4. An artificial eye provided with a detachable support adapted to rest upon the socket, substantially as and for the purposes set forth.

In testimony whereof I have hereunto signed my name in the presence of two witnesses.

JOHN L. BORSCH.

Witnesses:
AUGUSTUS B. STOUGHTON,
HERMANN BORMANN.